(12) United States Patent
Shrestha et al.

(10) Patent No.: US 11,029,192 B2
(45) Date of Patent: Jun. 8, 2021

(54) HIGH-CAPACITY WEIGHING MODULE

(71) Applicants: Mettler-Toledo (Changzhou) Precision Instruments Co., Ltd., Changzhou (CN); Mettler-Toledo (Changzhou) Measurement Technology Co., Ltd., Changzhou (CN); Mettler-Toledo International Trading (Shanghai) Co., Ltd., Shanghai (CN)

(72) Inventors: Rabin Shrestha, Mangalpur (NP); Tom Leahy, Neagh (IE); Ping Zhang, Changzhou (CN); Ferenc Muranyi, Zürich (CH)

(73) Assignees: Mettler-Toledo (Changzhou) Precision Instruments Co., Ltd., Changzhou (CN); Mettler-Toledo (Changzhou) Measurement Technology Co., Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 114 days.

(21) Appl. No.: 16/564,191

(22) Filed: Sep. 9, 2019

(65) Prior Publication Data
US 2020/0080886 A1    Mar. 12, 2020

(30) Foreign Application Priority Data

Sep. 10, 2018 (CN) .......................... 201811050909.2

(51) Int. Cl.
*G01G 3/12* (2006.01)
*G01G 19/22* (2006.01)
*G01G 21/23* (2006.01)

(52) U.S. Cl.
CPC ............... *G01G 19/22* (2013.01); *G01G 3/12* (2013.01); *G01G 21/23* (2013.01)

(58) Field of Classification Search
CPC ........... G01G 3/12; G01G 19/22; G01G 21/23
See application file for complete search history.

(56) References Cited

U.S. PATENT DOCUMENTS

| 7,214,893 B2 * | 5/2007 | Sikula ..................... G01G 21/23 177/238 |
| 7,504,594 B1 * | 3/2009 | Ruth ....................... G01G 21/24 177/128 |
| 7,980,129 B2 * | 7/2011 | Jaeger ..................... G01F 23/20 73/290 V |

* cited by examiner

*Primary Examiner* — Randy W Gibson
(74) *Attorney, Agent, or Firm* — Standley Law Group LLP; Jeffrey S. Standley; Stephen L. Grant

(57) ABSTRACT

A high-capacity weighing module has a top plate weldment (10), a bottom plate weldment (30) and a pressure-bearing assembly (20) that is between the top and bottom plate weldments. Motion between the respective top and bottom plate weldments is restricted. This structure aids in easy installation and replacement of a sensor, and integrates the functions of anti-overturning and 360° inspection, and bottom stop. This makes the weighing module much more convenient to install than a conventional high-capacity module, and has a better safety function. The weighing module has advantage in terms of a simplified product structure, reduced cost of manufacture and maintenance, uncomplicated installation procedure, and higher safety and protection.

16 Claims, 5 Drawing Sheets

HIGH-CAPACITY WEIGHING MODULE

CROSS-REFERENCE TO RELATED APPLICATIONS

This application claims the benefit of priority to Chinese patent application 201811050909.2, filed on 10 Sep. 2018, which is incorporated by reference as if fully recited herein.

TECHNICAL FIELD

The present invention relates to the field of weighing modules, and in particular to a high-capacity weighing module.

BACKGROUND ART

In the cement, chemical, pharmaceutical, animal husbandry and other industries, a weighing method is commonly used to mix materials or control the material level. The weighing method specifically consists of installing a plurality of weighing modules at the bottom of a bearing member (such as a charging bucket, a charging hopper, a container, etc.), and the materials discharged into the bearing member are measured by weighing sensors located inside the weighing modules.

In prior art, a typical weighing module mainly comprises a bottom plate, a top plate, a weighing sensor and a force transfer member. The weighing sensor is securely mounted between an upper pressure-bearing head and a lower pressure-bearing head, and the upper pressure-bearing head and the lower pressure-bearing head are mounted between the top plate and the bottom plate, so that a weight transfer from a bearing member is received on the weighing sensor. A high-capacity weighing module is generally equipped with a column type-weighing sensor.

From the structure of a typical high-capacity weighing module, it can be seen that the module kit and the sensor are both very heavy. Due to this, the module installation is time consuming, especially in case of installation and replacement of the sensor. Moreover, in order to reduce the overall weight of the module assembly, the anti-overturning and bottom stop functions are usually provided as separate accessories.

Therefore, the conventional high-capacity weighing module is bulky and heavy, expensive, lacks a lifting function for the charging bucket, complex in structure (comprising many installation attachments for safety protection), and is time- and labor consuming to install.

Therefore, the applicant aims to improve the structure of the prior art weighing module to overcome the aforementioned defects.

SUMMARY OF INVENTION

The technical problem to be solved by the present invention is to provide a high-capacity weighing module that is capable of offering a more comprehensive mechanical protection function than the existing modules offer besides overcoming the challenges of excessive time and labor consumption at the time of installation.

According to the present invention, the above-mentioned technical problem is solved by a high-capacity weighing module comprising a top plate weldment, a pressure-bearing assembly and a bottom plate weldment. The pressure-bearing assembly is fixed between the top plate weldment and the bottom plate weldment. A cavity structure is provided on a front side of the top plate weldment. The cavity structure and the bottom plate weldment form a chamber that is open on a front side of the high-capacity weighing module. The pressure-bearing assembly is disposed in the chamber. The pressure-bearing assembly comprises an upper pressure-bearing head, a sensor and a lower pressure-bearing head, such that the upper pressure-bearing head being mounted at an upper end of the sensor, and the lower pressure-bearing head being mounted at a lower end of the sensor. According to the present invention, at least two top-plate locating pins are provided on an inner top wall face of the cavity structure, and an upper end of the upper pressure-bearing head is inserted between the top-plate fixing pins or at least two bottom-plate locating pins are provided in the chamber at a position corresponding to an upper end face of the bottom plate weldment, and a lower end of the lower pressure-bearing head is inserted between the bottom-plate locating pins.

In an advantageous embodiment of the present invention, the weighing module further comprises at least two movement-restricting means mounted between a lower end face of the top plate weldment and an upper end face of the bottom plate weldment.

According to an embodiment of the present invention, an upper end of the upper pressure-bearing head is mounted to an inner top wall face of the cavity structure by means of a first pin fixing bolt and a first pin; and a lower end of the lower pressure-bearing head is mounted to the upper end face of the bottom plate weldment by means of a second pin fixing bolt and a second pin, and the lower pressure-bearing head is located in the cavity structure.

According to an embodiment of the present invention, each of the movement-restricting means comprises a bolt and a bolt seat. The bolt seat being fixed to the bottom plate weldment, and the bolt being connected by means of threads to the bolt seat; and a horizontal limiting hole is provided at a bottom end of the top plate weldment, and the bolt seat cooperates with the horizontal limiting hole to realize 360° horizontal limiting.

In a preferred embodiment of the present invention, a flat washer is provided between the bolt seat and the bolt.

According to an embodiment of the present invention, a middle plate is provided at the bottom of the top plate weldment, and a gap is provided between a lower end face of the middle plate and an upper end face of the bottom plate weldment.

According to an embodiment of the present invention, a hydraulic lifting opening is provided upward from a bottom edge of a rear side of the cavity structure.

The positive and progressive effects of the present invention lie in that the high-capacity weighing module of the present invention mainly has a designed function for lifting the charging bucket. For the purpose of safe and convenient installation of the sensor and for module calibration and replacement the combined function of anti-overturning and 360° inspection and the bottom stop function are realized by the top plate and the bottom plate of the same structure. The function of installation and replacement of the sensor is realized by detachable bolts and bolted joints.

The structure of the high-capacity weighing module of the present invention allows easy installation and replacement of the sensor, and integrates the functions of anti-overturning, 360° inspection, and the bottom stop function into one. Therefore, the inventive high-capacity weighing module is much more convenient to install and has a better safety function than the conventional high-capacity module. The inventive high-capacity weighing module simplifies the product structure, reduces the cost, removes the complexities associated with the installation procedure, and provides better safety and protection.

BRIEF DESCRIPTION OF DRAWINGS

The features, characteristics and advantages of the present invention will become more apparent from the following description when read in conjunction with the accompanying drawings and embodiments, and the same reference numerals indicate the same features throughout the accompanying drawings, in which.

DESCRIPTION OF EMBODIMENTS

Figure 1:
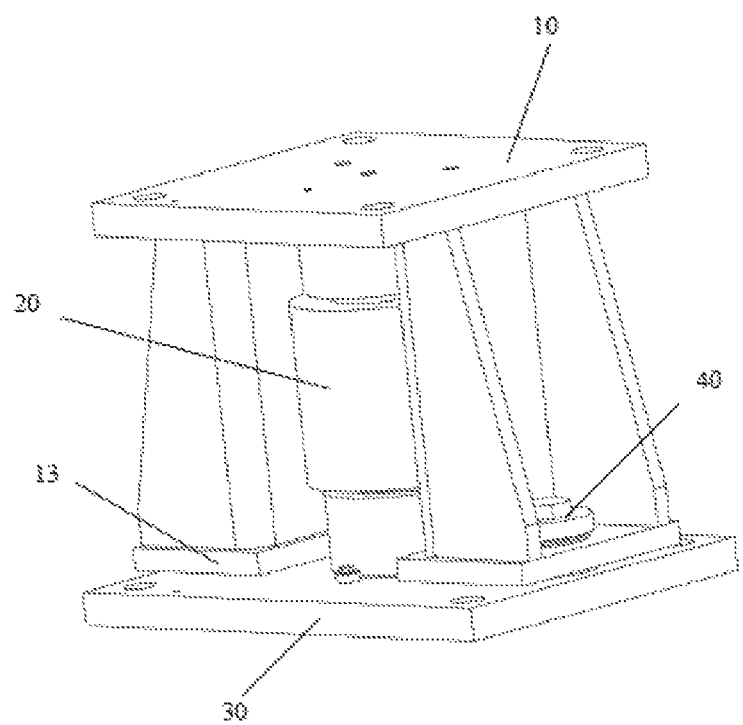
FIG. 1 is a perspective view of a high-capacity weighing module of the present invention.

To make the above objects, features and advantages of the present invention simpler to understand, the present invention will be further described in detail below in conjunction with the accompanying drawings and particular embodiments.

Reference will now be made to the preferred embodiments of the present invention, examples of which are illustrated in the accompanying drawings. The same reference numerals used in all the figures denote identical or similar parts wherever possible.

Furthermore, although the terms used in the present invention are selected from well-known common terms, some of the terms mentioned in the description of the present invention may have been selected by the applicant according to his or her judgement, and the detailed meaning thereof is described in the relevant section described herein.

Furthermore, the present invention must be understood, not simply by the actual terms used but also by the meanings encompassed by each term.

Figure 2:
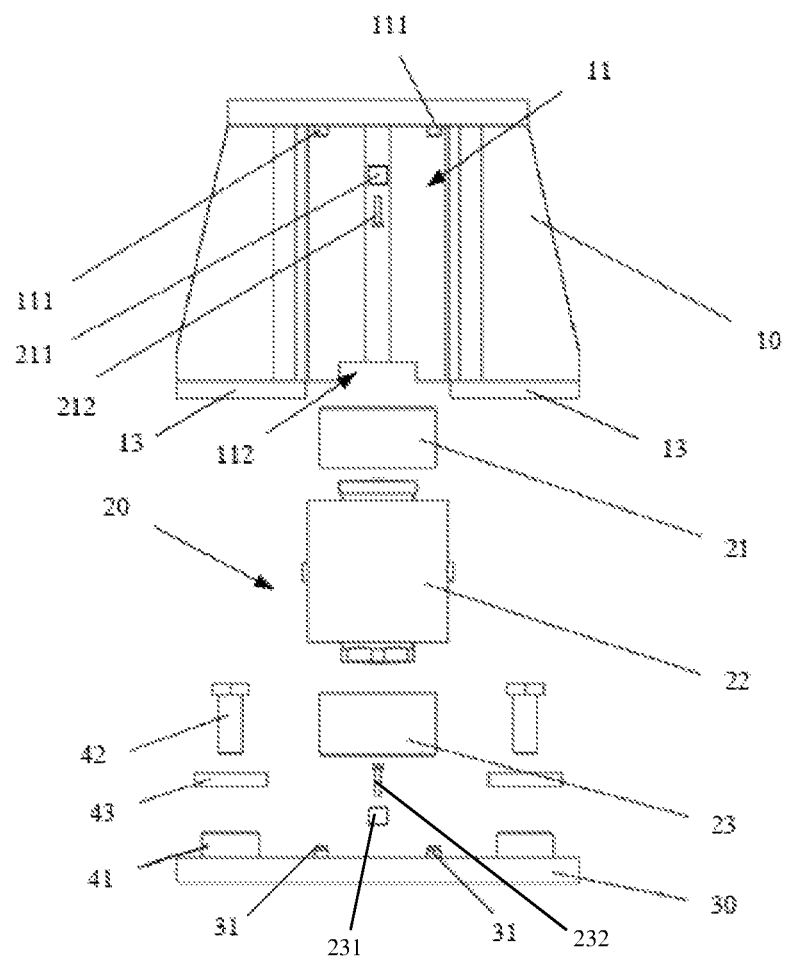
FIG. 2 is an exploded view of the high-capacity weighing module of the present invention.
Figure 3:
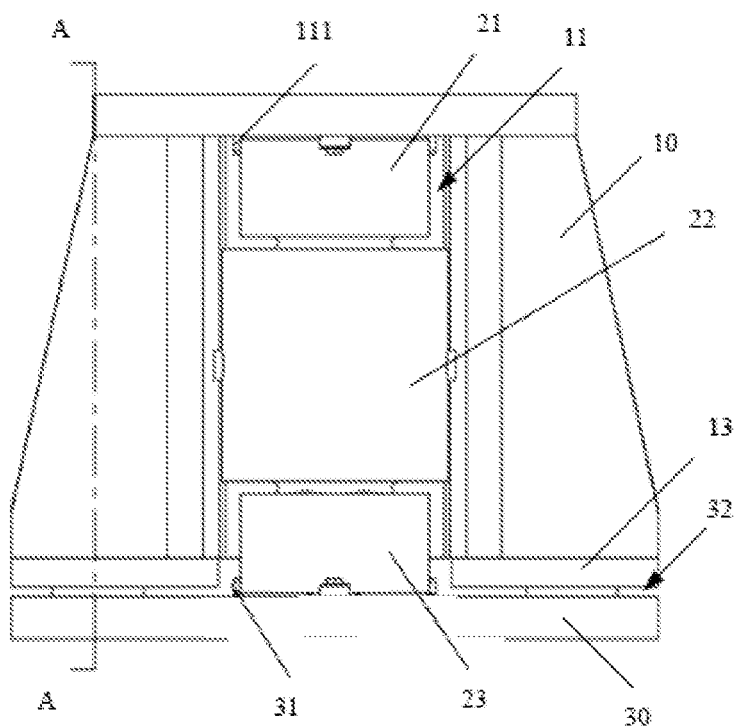
FIG. 3 is a front view of the high-capacity weighing module of the present invention.
Figure 4:
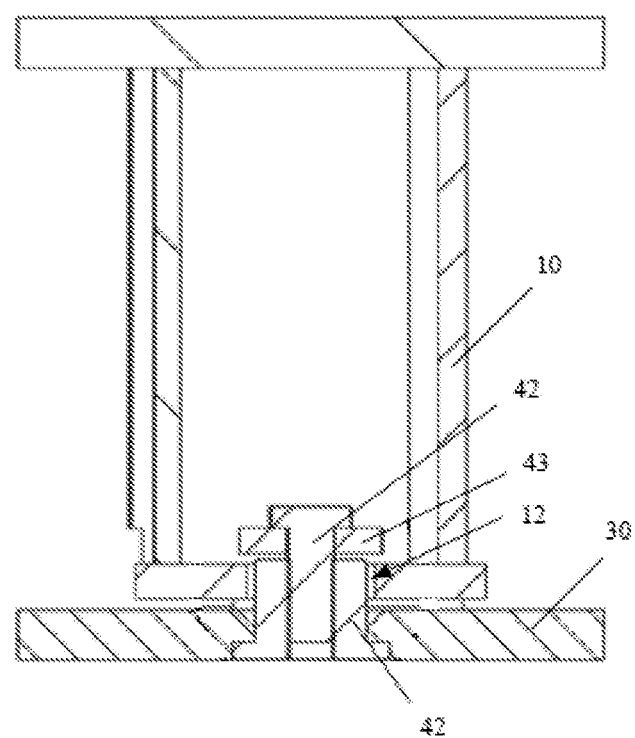
FIG. 4 is a sectional view taken along line A-A in FIG. 3.
Figure 5:
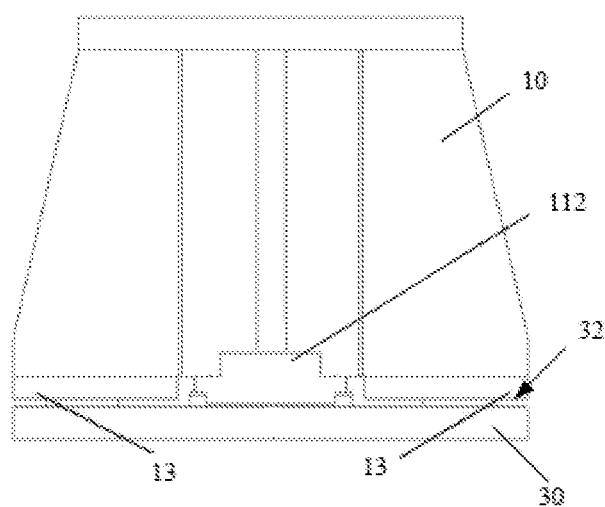
FIG. 5 is a rear view of the high-capacity weighing module of the present invention.

FIG. 1 is a perspective view of a high-capacity weighing module of the present invention. FIG. 2 is an exploded view of the high-capacity weighing module of the present invention. FIG. 3 is a front view of the high-capacity weighing module of the present invention. FIG. 4 is a sectional view taken along line A-A in FIG. 3. FIG. 5 is a rear view of the high-capacity weighing module of the present invention.

As shown in FIGS. 1 to 5, the present invention discloses a high-capacity weighing module, which comprises a top plate weldment 10, a pressure-bearing assembly 20 and a bottom plate weldment 30, wherein the pressure-bearing assembly 20 is fixed between the top plate weldment 10 and the bottom plate weldment 30.

A cavity structure 11 is provided on the front side of the top plate weldment 10, the cavity structure 11 and the bottom plate weldment 30 form a chamber that is open on the front side of the high-capacity weighing module, and the pressure-bearing assembly 20 is disposed in the chamber.

In particular, the pressure-bearing assembly 20 comprises an upper pressure-bearing head 21, a sensor 22 and a lower pressure-bearing head 23, the upper pressure-bearing head 21 being mounted at an upper end of the sensor 22, and the lower pressure-bearing head 23 being mounted at a lower end of the sensor 22. An upper end of the upper pressure-bearing head 21 is mounted to an inner top wall face of the cavity structure 11 by means of a first pin-fixing bolt 212 and a first pin 211. At the same time, at least two top-plate locating pins 111 are provided on an inner top wall face of the cavity structure 11, and an upper end of the upper pressure-bearing head 21 is inserted between the top-plate locating pins 111.

Similarly, a lower end of the lower pressure-bearing head 23 is mounted to an upper end face of the bottom plate weldment 30 by means of a second pin-fixing bolt 232 and a second pin 231, and the lower pressure-bearing head 23 is located in the cavity structure 11. At the same time, at least two bottom-plate locating pins 31 are provided in the cavity structure 11, i.e., in the chamber at a position corresponding to an upper end face of the bottom plate weldment 30, and a lower end of the lower pressure-bearing head 23 is inserted between the bottom-plate locating pins 31.

The number of the top-plate locating pins 111 and of the bottom-plate locating pins 31 is not limited herein, and can be set according to actual needs.

In this embodiment, the upper end of the upper pressure-bearing head 21 is fixed to the inner top wall face of the cavity structure 11 by using two top-plate locating pins 111 and a pair of detachable first pin-fixing bolt 212 and first pin 211. The lower end of the lower pressure-bearing head 23 is fixed to the upper end face of the bottom plate weldment 30 by using two bottom-plate locating pins 31 and a pair of detachable second pin-fixing bolt 232 and second pin 231.

The first pin-fixing bolt 212 and second pin-fixing bolt 232 in this embodiment are pin-fixing bolts by which the fixed pressure-bearing heads are detachable, and the first pin 211 and the second pin 231 are pins by which the fixed pressure-bearing heads are movable, and the sensor can be conveniently replaced via the detachable pins and bolts.

Further, at least two movement-restricting means 40 are mounted between a lower end face of the top plate weldment 10 and an upper end face of the bottom plate weldment 30, each of the movement-restricting means 40 comprises a bolt 42 and a seat 41, the bolt seat 41 being fixed to the bottom plate weldment 30, and the bolt 42 being connected by means of threads to the bolt seat 41. The bolt seat 41 is preferably welded to the bottom plate weldment 30 herein. A horizontal limiting hole 12 is provided at a bottom end of the top plate weldment 10, and the bolt seat 41 cooperates with the horizontal limiting hole 12 to realize 360° horizontal limiting.

In addition, a flat washer 43 is provided between the bolt seat 41 and the bolt 42 to reduce the wear between the bolt 42 and the bolt seat 41. The bolt seat 41 is knocked in and welded with the bottom plate, which can provide a combined function of standard anti-overturning and 360° inspection. The bolt 42 and the flat washer 43 are connected by means of threads to the bolt seat 41. The flat washer 43 is located between the bolt 42 and the bolt seat 41, with a gap being provided between a lower plane of the flat washer 43 and an upper plane of the middle plate 13, providing an anti-overturning protection function.

Furthermore, a middle plate 13 is further provided at the bottom of the top plate weldment 10 such that a gap 32 is provided between the lower end face of the middle plate 13 and the upper end face of the bottom plate weldment 30. Thus, the middle plate 13 can provide a bottom stop function. When the sensor fails, the top plate weldment 10 will fall down a few millimeters to the bottom plate weldment 30 so that the charging bucket is protected.

In addition, a hydraulic jacking opening 112 is provided upward from a bottom edge of a backside of the cavity structure 11, and can be used for placing a hydraulic jack.

When the charging bucket needs to be lifted and the sensor needs to be mounted and replaced, the hydraulic jack can be used for hydraulically lifting upward from the opening 112 to lift the module by a few millimeters, and then the detachable pins for fixing the upper pressure-bearing head 21 and the lower pressure-bearing head 23 are detached from the fixing bolts. Finally, the upper pressure-bearing head 21, the lower pressure-bearing head 23 and the sensor 22 are removed.

According to the structure described above, the high-capacity weighing module of the present invention mainly has a designed function of lifting the charging bucket, and for the purpose of safe and convenient installation of the sensor and module calibration and replacement, the combined functions of anti-overturning and 360° inspection and the bottom stop function are realized by the top plate and the bottom plate of the same structure. The function of installation and replacement of the sensor is realized by detachable bolts and bolted joints.

In summary, the structure of the high-capacity weighing module of the present invention aids in easy installation and replacement of the sensor, and integrates the functions of anti-overturning, 360° inspection, and the bottom stop function.

Therefore, the inventive high-capacity weighing module is convenient to install than a conventional high-capacity module, and offers better safety function. The high-capacity weighing module hitherto described offers several benefits such as a simplified product structure, reduced cost of manufacture and maintenance, uncomplicated installation procedure, and higher safety and protection.

While the particular embodiments of the present invention have been described, a person skilled in the art shall understand that these are merely illustrative, and that the scope of protection of the present invention is defined by the appended claims. Various alterations or modifications to these embodiments, like providing the cavity structure on a front side of the bottom plate weldment so that the cavity structure and the top plate weldment form the chamber that is open on a front side, can be made by a person skilled in the art without departing from the principle and essence of the present invention; however, these alterations and modifications all fall within the scope of protection of the present invention.

REFERENCE SIGNS LIST

10 Top plate weldment
20 Pressure-bearing assembly
30 Bottom plate weldment
40 movement-restricting means
11 Cavity structure
21 Upper pressure-bearing head
22 Sensor
23 Lower pressure-bearing head
211 First pin
212 First pin-fixing bolt
231 Second pin
232 Second pin-fixing bolt
111 Top plate-locating pin
31 Bottom plate-locating pin
41 bolt seat
42 bolt
12 Horizontal limiting hole
43 Flat washer
13 Middle plate
32 Gap
112 Hydraulic lifting opening

What is claimed is:

1. A module for weighing, comprising:
a top plate weldment, having a cavity structure on a front side thereof;
a bottom plate weldment, positioned such that the bottom plate weldment forms a chamber that is open on a front side with the cavity structure;
a pressure-bearing assembly, fixed between the respective top and bottom plate weldments in the chamber, the pressure-bearing assembly comprising;
an upper pressure-bearing head,
a lower pressure-bearing head; and
a sensor, positioned such that the upper pressure-bearing head is mounted at an upper end of the sensor and the lower pressure-bearing head is mounted at a lower end of the sensor; and
at least one of the following:
at least two top-plate locating pins, provided on an inner top wall face of the cavity structure, with an upper end of the upper pressure-bearing head is inserted between the top-plate locating pins, or
at least two bottom-plate locating pins, provided in the chamber at a position corresponding to an upper end face of the bottom plate weldment, with a lower end of the lower pressure-bearing head inserted between the bottom-plate locating pins.

2. The module of claim 1, further comprising:
at least two means for restricting movement, mounted between a lower end face of the top plate weldment and an upper end face of the bottom plate weldment.

3. The module of claim 1, further comprising:
a first pin fixing bolt and a first pin that mounts an upper end of the upper pressure-bearing head to an inner top wall face of the cavity structure; and
a second pin fixing bolt and a second pin that mounts a lower end of the lower pressure-bearing head, located in the cavity structure, to the upper end face of the bottom plate weldment.

4. The module of claim 2, wherein:
each of means for restricting movement comprises a bolt seat that is fixed to the bottom plate weldment and a bolt that is connected to the bolt seat by means of threads; and
a horizontal limiting hole is provided at a bottom end of the top plate weldment, so the bolt seat cooperates with the horizontal limiting hole to realize 360° horizontal limiting.

5. The module of claim 4, further comprising:
a flat washer, located between the bolt seat and the bolt.

6. The module of claim 1, further comprising:
a middle plate at the bottom of the top plate weldment; with a gap provided between a lower end face of the middle plate and the upper end face of the bottom plate weldment.

7. The module of claim 1, further comprising:
a hydraulic lifting opening, located upward from a bottom edge of a rear side of the cavity structure.

8. The module of claim 2, further comprising:
a first pin fixing bolt and a first pin that mounts an upper end of the upper pressure-bearing head to an inner top wall face of the cavity structure; and a second pin fixing bolt and a second pin that mounts a lower end of the lower pressure-bearing head, located in the cavity structure, to the upper end face of the bottom plate weldment.

9. The module of claim 3, further comprising:
a middle plate at the bottom of the top plate weldment; with a gap provided between a lower end face of the middle plate and the upper end face of the bottom plate weldment.

10. The module of claim 2, further comprising:
a middle plate at the bottom of the top plate weldment; with a gap provided between a lower end face of the middle plate and the upper end face of the bottom plate weldment.

11. The module of claim 5, further comprising:
a middle plate at the bottom of the top plate weldment; with a gap provided between a lower end face of the middle plate and the upper end face of the bottom plate weldment.

12. The module of claim 6, further comprising:
a hydraulic lifting opening, located upward from a bottom edge of a rear side of the cavity structure.

13. The module of claim 3, further comprising:
a hydraulic lifting opening, located upward from a bottom edge of a rear side of the cavity structure.

14. The module of claim 2, further comprising:
a hydraulic lifting opening, located upward from a bottom edge of a rear side of the cavity structure.

15. The module of claim 5, further comprising:
a hydraulic lifting opening, located upward from a bottom edge of a rear side of the cavity structure.

16. The module of claim 11, further comprising:
a hydraulic lifting opening, located upward from a bottom edge of a rear side of the cavity structure.

* * * * *